(12) United States Patent
Spender

(10) Patent No.: US 6,823,358 B1
(45) Date of Patent: Nov. 23, 2004

(54) ENABLING MULTIPLE CLIENT ACCESS TO A PROCESS-BASED SYSTEM OR PROGRAM FROM A SINGLE JAVA VIRTUAL MACHINE

(75) Inventor: Adrian William Spender, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 09/677,000

(22) Filed: Sep. 29, 2000

(51) Int. Cl.[7] ............................................. G06F 15/16
(52) U.S. Cl. ...................... 709/203; 709/201; 705/26; 707/103 Y
(58) Field of Search ............................... 709/201, 203; 705/26; 707/103 Y; 704/103

(56) References Cited

U.S. PATENT DOCUMENTS

| | | | |
|---|---|---|---|
| 5,553,242 A | * 9/1996 | Russell et al. | 709/227 |
| 5,854,628 A | * 12/1998 | Nakagawa | 345/803 |
| 6,223,202 B1 | * 4/2001 | Bayeh | 709/102 |
| 6,256,637 B1 | * 7/2001 | Venkatesh et al. | 707/103 Y |
| 6,334,114 B1 | * 12/2001 | Jacobs et al. | 705/26 |
| 6,343,308 B1 | * 1/2002 | Marchesseault | 709/1 |
| 6,434,618 B1 | * 8/2002 | Cohen et al. | 709/228 |
| 6,463,459 B1 | * 10/2002 | Orr et al. | 709/203 |

FOREIGN PATENT DOCUMENTS

JP          2001225913 A   *   8/2001   ......... B65G/01/137

* cited by examiner

*Primary Examiner*—Hosain Alam
*Assistant Examiner*—Liang-che Wang
(74) *Attorney, Agent, or Firm*—A. Bruce Clay; Yee & Associates, P.C.

(57) ABSTRACT

Provided are a method, apparatus and a computer program product which address the problem of differentiating between processes which appear to a server process to have the same process ID associated with them, for example processes which run within a common process such as a single Java Virtual Machine (JVM). A server process which relies on the process ID to differentiate between sender client processes cannot determine the source of a request. This problem can lead to conflicts between requests which are sent by different client processes running under the same process ID. The problem is solved by creating a set of dispatcher processes and associating one with each requester process. Then requests which are sent to a server process for processing are sent via the respective dispatcher process and its unique process ID is attached to the request. The server process can now use the dispatcher process ID to differentiate between requester clients.

15 Claims, 2 Drawing Sheets

ENABLING MULTIPLE CLIENT ACCESS TO A PROCESS-BASED SYSTEM OR PROGRAM FROM A SINGLE JAVA VIRTUAL MACHINE

FIELD OF THE INVENTION

The present invention relates to enabling multiple client requesters running within the scope of a single process (such as a single Java Virtual Machine) to be distinguished from each other when accessing a system or computer program which relies on process identifiers. The invention is particularly applicable when providing Java client support for a process-based legacy system or program.

BACKGROUND

In certain distributed client/server data processing environments, many client processes such as application programs can request services provided by one or more servers (e.g. a transactional resource manager program, or any other process having a server/client relationship to the requester processes) and the source of the request is determined at the server by two pieces of information: the system identifier of the machine the client process is running on and a process identifier of the client process. This method of recognising requests has proven effective in the past, because each individual application program and each executable piece of code running on a data processing system is allocated a system-unique process identifier which can be sent to the server.

It is known in the art to provide system architectures and communication protocols which always maintain a direct connection between a client requester process and a server process, and for server processes to identify the individual requester by means of this connection (such as if both the client requester process and the server process support TCP/IP socket connections and the server process can identify individual client requesters using the TCP/IP socket connection). However, as noted above, some server processes (including some legacy programs architected before TPC/IP communication was so widely used) use a process identifier to identify the origin of a request. This latter method of recognising requests is suitable for traditional client applications which are compiled into an executable form and each run in their own process.

However, applications written in the Java programming language may be running in, or may communicate with a Servlet running in, a Java Virtual Machine under the same process identifier. Therefore, it is possible for requests from two or more clients which are sent via the same Java Virtual Machine to have the same system identifier and process identifier such that a server which receives the requests is unable to distinguish them as originating from different client applications. This leads to problems routing replies and potential resource access conflicts. For instance, two clients running within a single process (Java Virtual Machine) may make requests to obtain rows from a shared data source. If the data source provider uses a combination of system identifier and process identifier (or uses only a network-unique process identifier) to allocate a shared lock on the data source, then the two clients will be indistinguishable to the data source, and requests from both will be treated as requests originating from a single client. If client A begins to iterate through the rows of the data source then it will retrieve each row in turn, and in order starting from the first row. If client B, running within the same process then starts to iterate through the data source, the data source will recognise an iteration request from the same, indistinguishable, client and provide the next row which should have been provided to client A. (Java is a trademark of Sun Microsystems Inc.)

This problem could arise for any server process, program or system which fulfils a server role within a data processing network and which differentiates between client processes by means of a process identifier, if it is possible for multiple client requesters to appear to have the same process identifier.

SUMMARY OF THE INVENTION

In a first aspect, the present invention provides a method for managing communications between requester processes and server processes in a data processing network, including: creating a set of dispatcher processes, each having a unique process identifier; associating each of a set of requester processes, which communicate with a server process via a common interpreter process, with a different dispatcher process of said set of dispatcher processes; for requests sent from any of said set of requester processes via said common interpreter process to a server process which identifies requester processes using a process identifier, routing said requests via the associated dispatcher process; at the respective dispatcher process, attaching the unique identifier of the dispatcher process to the request and then forwarding the request to the server process; and responsive to receipt by the dispatcher process of a reply to said request, forwarding the reply to the associated requester process.

The invention addresses the problem of differentiating between processes which appear to a server process to have the same process ID associated with them, for example processes which run within a common process such as a single Java Virtual Machine (JVM), such that a server process which relies on the process ID to differentiate between sender client processes cannot determine the source of a request. This problem can lead to routing problems and conflicts between requests which are sent by different client processes running under the same process ID, particularly if the client processes are running concurrently.

The invention is particularly advantageous for providing Java client support for a legacy computer program, where multiple concurrent client access is desired. This is of particular benefit when the Java support is required to enable the legacy program to interoperate with a Web application server which has multiple Servlet threads running within its JVM to service multiple concurrent clients (Web Browsers). The present invention can then be used to enable Web-based access to the legacy program from client systems and devices which do not have the legacy program installed.

A further advantage of the invention is that it is implementable without completely rewriting an existing legacy architecture.

According to a second aspect, the invention provides a computer program, preferably implemented as a program product comprising program code recorded on a machine readable recording medium, the program code including instructions for controlling the operation of an apparatus to implement a method as described above.

According to a third aspect, the invention provides a data processing apparatus comprising means for implementing a method as described above, as set out in the accompanying claims.

BRIEF DESCRIPTION OF DRAWINGS

A preferred embodiment of the invention will now be described in more detail, by way of example, with reference to the accompanying drawings in which.

DETAILED DESCRIPTION OF PREFERRED EMBODIMENTS

Figure 1:
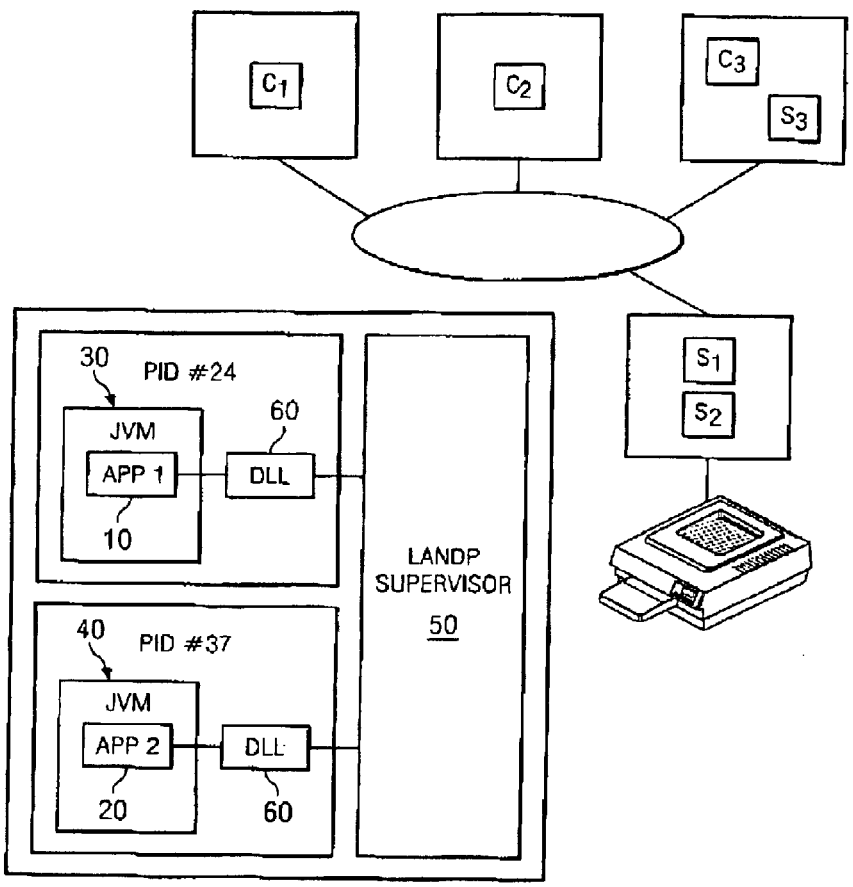
FIG. 1 is a schematic representation of two applications running in separate JVMs accessing a server process.

The invention is implementable in many different data processing systems and computer programs in which communicating processes are identified using a process identifier. The problem which is addressed by the invention potentially arises wherever Java applications send requests to a system that identifies requests by a process ID, and also in other environments if multiple client processes run within a single process having a process ID such that the single process ID is associated with requests from the multiple clients.

For example, the invention is implementable in IBM Corporation's LANDP retail banking middleware solution, which allows client applications to access a range of LANDP services in a client-server model. LANDP client applications written typically in C or COBOL make requests to LANDP servers which may be local, or remote on another machine.in the LAN. Each workstation in the LAN runs a LANDP supervisor process which acts as a co-ordinator and router of requests, determining whether a request is for local or remote services and, if remote, passing the request to a LAN server component which maps workstation IDs to network addresses. LANDP servers receive requests from LANDP clients. The source of the request is determined by the workstation ID of the machine the client is running on (the workstation ID is a two character ID assigned when a LANDP workgroup is set up) and the Process ID of the client application which is unique on the respective client machine. It is the job of the LAN component to route a reply to the supervisor on the machine identified by the system identifier, then the supervisor routes it to the correct process identified by its process ID. Thus the LAN component acts as a router between machines on a LANDP workgroup, and the supervisor acts as a router which can put replies back to the correct process on a particular machine. This method of recognising requests using a process ID is suitable for traditional client applications which are compiled into an executable and run in their own process, but requires further adaptation in order to provide satisfactory support for writing LANDP clients in Java. (LANDP and IBM are trademarks of International Business Machines Corporation.)

As Java applications, applets or servlets run within a Java Virtual Machine, under a single Process ID. Since requests from two or movie Java applications would typically have the same workstation ID and process ID associated with them, a problem arises that LANDP servers would not be able to distinguish those requests as originating from separate client applications. From the perspective of the server process, the JVM is the source of all the requests.

A solution according to the preferred embodiment of the present invention allows any number of separate LANDP client applications, written in Java and running within the same Java Virtual Machine, to be recognised as individual client applications. This is achieved by firstly allocating to each client a dispatcher process having a unique Process ID (as described below) and secondly routing all requests to LANDP servers through that uniquely identified dispatcher process. By allowing multiple LANDP clients from within the same JVM to be differentiated, it is possible to utilise the capabilities of Java to allow Web-based access to LANDP services from workstations that do not need to have LANDP code installed (the LANDP supervisor and LAN server code). These may be thin-client type devices which have not previously been supported by LANDP.

A manager application runs on the machine on which the Java Virtual Machine (JVM) containing the multiple LANDP client applications is running. The manager object on instantiation creates a number of dispatcher processes, each with its own unique Process ID. Each Java client within the JVM makes a call to the manager application requesting to register itself with one of the dispatcher processes. A Java client which has successfully registered with the manager will then have access to a dispatcher process that it can route its requests through. Requests from the Java client are made by calling a send( ) method. This method is preferably implemented in native code and routes the request not to the LANDP supervisor but to the dispatcher process. The dispatcher process then sends the request on behalf of the Java client to the LANDP supervisor. Thus, the request is seen to come from the Process ID of the dispatcher and not the Process ID of the Java Virtual Machine. On completion of the request, the LANDP supervisor returns the results to the dispatcher process which in turn sends them back to the respective Java client.

An example solution to ensure that LANDP requests from Java applications (applets and servlets) running in the same Java Virtual Machine under the same process ID can be processed independently will now be described in more detail.

In one implementation, the manager and dispatcher are implemented in the C programming language on a platform such as Microsoft's Windows NT or IBM's OS/2 operating system. A C DLL on both platforms provides Java Native Interface implementations of the register( ) send( ) and unregister( ) methods of the Java class representing a LANDP request. The DLL communicates with the manager and dispatcher using standard operating system functions such as named pipes and shared memory. (OS/2 is a trademark of International Business Machines Corporation. Windows is a trademark of Microsoft Corporation).

As is well known in the art, Java applications (applets and servlets) all run in a Java Virtual Machine. LANDP applications written in Java interface with a LANDP server via a DLL that is used to create and send a request (an RMTREQ) to a LANDP server. When the LANDP Java application calls this DLL it is loaded under the process ID of the JVM that the application is running in. RMTREQ requests are individually identified to LANDP by a combination of Process ID and Workstation ID.

FIG. 1 shows two LANDP applications 10, 20 running in separate JVMs 30, 40 accessing a LANDP supervisor 50. Since the applications 10 and 20 are running in separate JVMs, when the applications send a request (an RMTREQ), the DLL 60 is loaded by the process ID of the JVM. Hence the requests from the applications arrive at the LANDP supervisor 50 with different Process IDs (PIDs).

Figure 2:
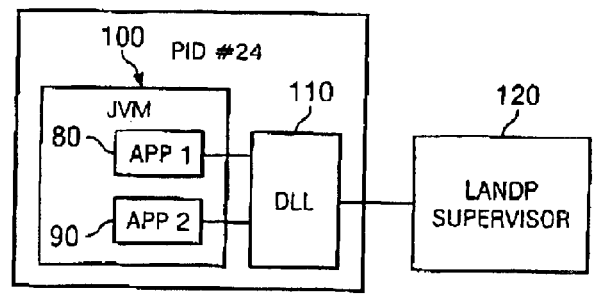
FIG. 2 is a schematic representation of two applications running in a single JVM and accessing a server process.

The problem occurs when two applications run in the same JVM, as shown in FIG. 2. Here, since both applications 80, 90 are running within the same JVM 100, when the DLL 110 is loaded by Application 80 making an RMTREQ, it is attached to the PID of the WVM 100. When Application 90 makes a request it uses the already loaded DLL 10. Therefore RMTREQs from both applications arrive at the LANDP supervisor 120 with the same PID and cannot be recognised as coming from separate applications.

Figure 3:
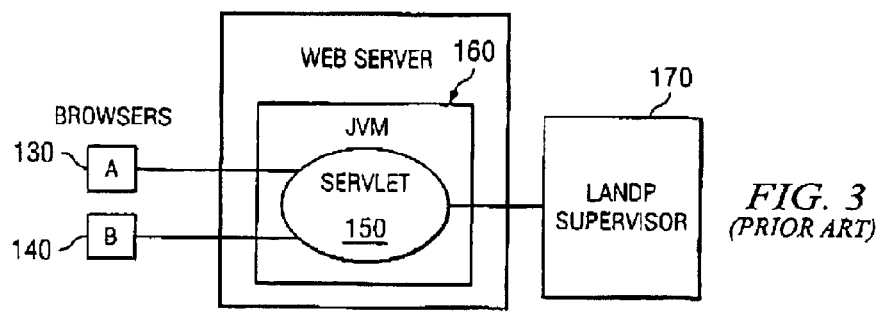
FIG. 3 shows two Web Browsers communicating with a server process via a Servlet running within a Web application server's JVM.

In recent years, server-centric programming models in which a central server or servers create requests to back end systems on behalf of clients have become increasingly prevalent. Typically, the central server applications are written in Java, using Java technologies such as Servlets and JavaBeans. A Servlet is a piece of server-side Java code that runs within a Web server or Web application server. Running more than one application within a JVM is now a common occurrence and this is especially so with Servlets. The Servlet processes requests from Web browsers, and runs within the JVM of the Web application server. The Servlet processes each request it receives in a thread. Thus, each client sends requests to the Servlet running on a central server and these requests result in requests being made on behalf of the clients by the Java Servlet to request services from back-end systems such as IBM's LANDP. The JVM runs as a process having a single process ID. Therefore a LANDP supervisor receiving requests via the Servlet would not be able to distinguish which requests came from which thread in the Servlet as they all arrive with the same Process ID. FIG. 3 shows this situation.

As shown in FIG. 3, two Web browsers 130, 140 are using the same Servlet 150. The Servlet may be a business application, for instance a home banking application. The users request information from the application via their browser, for instance requesting their latest account balance. The Servlet is running within thy web application server's JVM 160 (for instance IBM's WebSphere application server). Every time the Servlet 150 receives a new request it handles the request in a thread. Thus the Servlet can serve multiple concurrent clients. The Servlet creates requests to a LANDP server necessary to perform the operation and then sends them via an RMTREQ to the local LANDP supervisor 170. If requests come from both browsers A and B (130,140) it is therefore possible for these requests to generate RMTPEQs to the LANDP server that would interfere with one another, as they would appear to come from the same PID. (WebSphere is a trademark of International Business Machines Corporation).

According to this implementation of the invention, a new interface is provided between the LANDP Java class and the LANDP supervisor which can recognise where RMTREQs have come from (i.e. which piece of Java code running in a JVM) and then send them on to the supervisor ensuring that the results are sent back to the correct place.

One possible solution to the above problem would be to ensure that all Java applications that make requests to a LANDP server are run in separate JVMs. This would ensure that they each have separate PIDs. This is not a satisfactory solution since it imposes unacceptable restrictions on application developers, and in the case of Servlets it is contrary to the defined architecture. Secondly, the support for TCP/IP which is implemented within a LANDP server is not made visible to LANDP applications, and so conventional use of TCP/IP sockets is not applicable. Instead, a LANDP client only has to know the name of a server to communicate with it, since routing is handled by the supervisor and LAN server components of a LANDP network.

Therefore a solution is required which is implementable within a computer program such as the LANDP client/server transaction processing program, or within an interoperating computer program.

Java support within a LANDP server is implementable as follows. Firstly, Java classes are provided for an application developer to use when developing a LANDP application in Java. The first class, Cprb.class contains variables for all of the Common Programming Request Block (CPRB) fields, as well as a method to send that CPRB to the supervisor. The CPRB is the data structure which is sent across the network to send a request, and it includes the workstation ID and process ID. The second class, RmtReq.class provides a-send( ) method to actually send the CPRB to LANDP. The send( ) method of RmtReq.class is implemented within a DLL which implements a native method implementation of send( ) that creates a CPRB structure in memory and then sends it to the LANDP server, converting the resultant CPRB back into a Java object. This is in the form of a DLL written in C.

Solutions within the scope of the present invention solution include adaptations to the architecture of LANDP, or to the RmtReq.class Java class and C interface DLL. The preferred embodiment for solving the PID problem involves adaptations to the Java and interface code.

The DLL is loaded once into globally accessible memory, and then mapped into the private address space for each JVM. New processes are then created to serve independent sets of requests from Java clients.

The RmtReq object is used to represent a client by enforcing the rule that the same RmtReq object should be used to send all requests that are created on behalf of a single client. Effectively, each RmtReq object present in the JVM represents an individual client requesting services from LANDP via a Servlet within that JVM. Then all requests from a particular RmtReq object are processed by the interface code in their own distinct process.

It may be impossible for a DLL to create dispatcher processes for each RmtReq itself, if this is not allowed by many operating systems. Therefore, a mechanism is provided for creating a process through which to route the requests to LANDP, together with a method to tell the DLL to call this process. Three entities can be identified:

The DLL which implements the Java Native method send ( )

A service or daemon that is responsible far process management

An executable that can be loaded as a dispatcher process by the service to actually send requests to the supervisor.

Figure 4:
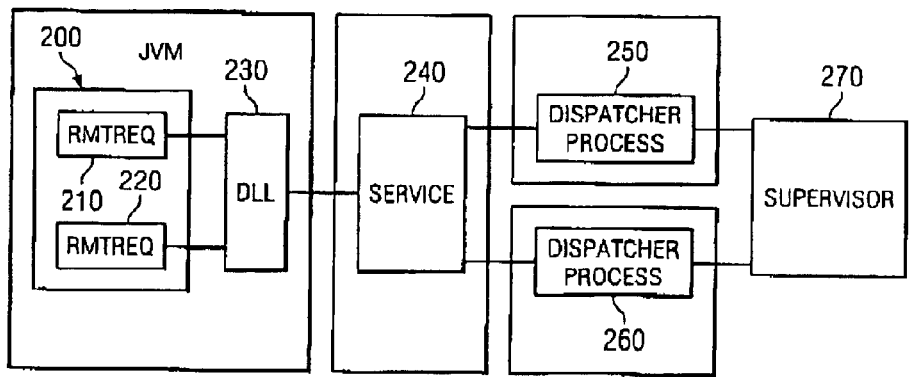
FIG. 4 is a schematic representation of components of the invention according to a preferred embodiment.
Figure 5:
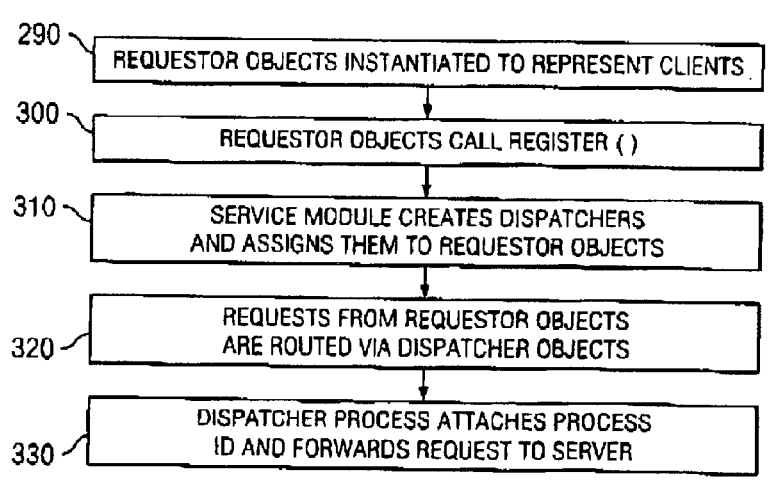
FIG. 5 shows steps of a method according to an embodiment of the invention.

A possible solution is shown in FIGS. 4 and 5. Each process within FIG. 4 is denoted by a dotted line. Referring to FIGS. 4 and 5, the JVM 200 runs as one process and there are two RmtReq objects 210,220 present, which are instantiated 290 to represent two clients. The requests generated by the each RmtReq object must be recognisable as coming from a distinct Process ID by the LANDP supervisor. The RmtReq class implements a register( ) method. This in turn calls 300 the service module 240 to request a dispatcher process 250,260 in which to send requests to a LANDP supervisor 270.

The Service module 240 is running permanently and performs the job of creating 310 dispatcher processes 250, 260 and then assigning them 310 to RmtReq objects 210,220 accordingly. To ensure that requests within a session always have the same PID, the service object 240 maintains a table of RmtReq objects to dispatcher processes. The RmtReq object (210,220), when instantiated 290 makes a call 300 to the service module 240 (via the DLL 230) to register itself.

The service module then assigns 310 a dispatcher process (250,260) to the RmtReq. Once registered, all requests from the RmtReq are routed 320 through that dispatcher process whenever the send( ) method is used. The dispatcher process attaches 330 its process identifier to requests before forwarding them to a LANDP server. When a client has finished sending requests via the servlet, an unregister( ) method can be called on RmtReq which will free the dispatcher process which can then be made available to other clients by the service module.

In addition to the specific embodiment described above, the invention has applicability to other distributed network communication architectures such as where private device and process identifiers are used under cover of a single proxy server IP address.

What is claimed is:

1. A method for managing communications between requester processes and server processes in a data processing network. including:
   creating a set of dispatcher processes, each have a unique dispatcher process identifier,
   associating each of a set of requester processes, which communicate with a server process via a common interpreter process having a common process identifier, with a unique dispatcher process of said set of dispatcher processes, wherein each of the set of requester processes executes within the common interpreter process having the common process identifier and wherein each of the set of requester processes shares the common process identifier;
   for requests sent from any of said set of requester processes via said common interpreter process to a server process which identifies each of said set of requester processes using the unique dispatcher process identifier, routing said requests via the associated dispatcher process;
   at the respective dispatcher process, attaching the unique dispatcher process identifier to the request and then forwarding he request to the server process; and
   responsive to receipt by the dispatcher process of a reply to said request, forwarding the reply to the associated requested process via the common interpreter process.

2. A method according to claim 1, where in the common interpreter process via which each of said set of requester processes associated with the unique dispatcher process communicates is a Java Virtual Machine.

3. A method according to claim 2, wherein the set of requester processes comprise Web Browsers which communicate with a server process via respective Servlet threads running within a JVM of a Web Server or Web application server.

4. A computer program product comprising program code recorded on a machine readable recording medium, the program code including instructions for, when executed, controlling the operating of a data processing apparatus to implement a method managing communications between requester processes and server processes in a data processing network, the method including:
   creating a set of dispatcher processes, each having a unique dispatcher process identifier;
   associating each of a set of requester processes, which communicate with a server process via a common interpreter process having a common process identifier, with a unique dispatcher process of said set of dispatcher processes, wherein each of the set of requester processes executes within the common interpreter process having the common process identifier and wherein each of the set of requester processes shares the common process identifier;
   for requests sent from any of said set of requester processes via said common interpreter process to a server process which identifies each of said set of requester processes using the unique dispatcher process identifier, routing said requests via the associated dispatcher process;
   at the respective dispatcher process, attaching the unique dispatcher process identifier to the request and then forwarding the request to the server process; and
   responsive to receipt by the dispatcher process of a reply to said request, forwarding the reply to the associated requester process.

5. A data processing apparatus, including:
   a server process which uses identifiers to distinguish between requests received from different client processes;
   means for creating a set of dispatcher processes, each having a unique dispatcher process identifier;
   means for associating each of a set of requester processes, which communicate with the server process via a common interpreter process having a common process identifier, with a unique dispatcher process of said set of dispatcher processes, wherein each of the set of requester processes executes within the common interpreter process having the common process identifier and wherein each of the set of requester processes shares the common process identifier;
   means for routing requests from a requester process, comprising requests sent to the server process from any of said set of requester processes via the common interpreter process, via the respective associated dispatcher process;
   means associated with the respective dispatcher process for attaching the unique said respective dispatcher process identifier to the request and then forwarding the request to the server process; and
   means responsive to receipt by said respective dispatcher process of a reply to said request, for forwarding the reply to the associated requester process.

6. The method of claim 1, wherein associating each of a set of requester processes with a unique dispatcher process of said set of dispatcher processes includes invoking a service module to request a unique dispatcher process for each of the set of requester processes.

7. The method of claim 6, wherein the service module creates a unique dispatcher process for each of the set of requester processes and assigns each unique dispatcher process to each of the set of requester processes.

8. The method of claim 7, wherein the service module maintains a table of relationships between each of the requester processes and assigned unique dispatcher process.

9. The method of claim 6, wherein the service module is invoked by calling a register method implemented by each of the set of requester processes.

10. The method of claim 1, wherein routing said requests via the associated dispatcher process includes invoking a send method implemented by a native dynamically linked library.

11. The data processing apparatus of claim 5, wherein the means for associating each of a set of requester processes with a unique dispatcher process of said set of dispatcher processes includes means for invoking a service module to request a unique dispatcher process for each of the set of requester processes.

12. The data processing apparatus of claim 11, wherein the service module includes means for creating a unique dispatcher process for each of the set of requester processes and means for assigning each unique dispatcher process to each of the set of requester processes.

13. The data processing apparatus of claim 12, wherein the service module includes means for maintaining a table of relationships between each of the requester processes and assigned unique dispatcher process.

14. The data processing apparatus of claim 11, wherein means for invoking a service module includes means for calling a register method implemented by each of the set of requester processes.

15. The data processing apparatus of claim 5, wherein means for routing said requests via the associated dispatcher process includes means for invoking a send method implemented by a native dynamically linked library.

* * * * *